(12) United States Patent
Audren et al.

(10) Patent No.: US 6,628,044 B2
(45) Date of Patent: *Sep. 30, 2003

(54) VIBRATION MOTORS

(75) Inventors: Jean Thierry Audren, Saint Rémy les Chevreuses (FR); Daniel Bezanere, Antony (FR)

(73) Assignee: Sagem S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,323

(22) Filed: Mar. 9, 2001

(65) Prior Publication Data

US 2001/0035722 A1 Nov. 1, 2001

(30) Foreign Application Priority Data

Mar. 10, 2000 (FR) .............................................. 00 03084

(51) Int. Cl.$^7$ ................................................ H01L 41/02
(52) U.S. Cl. ............................ 310/323.02; 310/323.04; 310/320; 310/328
(58) Field of Search ................................ 310/81, 316.01, 310/316.02, 316.03, 320, 321, 323.02, 323.03, 323.04, 323.11, 323.08, 331, 328

(56) References Cited

U.S. PATENT DOCUMENTS

| 4,870,313 | A | * | 9/1989 | Hirama et al. ............... 310/320 |
| 5,229,678 | A | * | 7/1993 | Miyazawa ................... 310/323 |
| 5,747,951 | A | | 5/1998 | Audren |
| 5,783,898 | A | * | 7/1998 | Wu ............................ 310/316 |
| 5,821,667 | A | * | 10/1998 | Takagi et al. ................ 310/317 |
| 6,060,816 | A | * | 5/2000 | Audren ................... 310/323.02 |
| 6,204,590 | B1 | * | 3/2001 | Audren et al. ......... 310/316.01 |
| 6,229,246 | B1 | * | 5/2001 | Kaida ........................ 310/320 |

* cited by examiner

*Primary Examiner*—Nestor Ramirez
*Assistant Examiner*—Thanh Lam
(74) *Attorney, Agent, or Firm*—Blakely, Sokoloff, Taylor & Zafman (57) ABSTRACT

A vibration motor comprising at least one stationary part and one part driven to move relative to the fixed part, together with excitation that is suitable for exerting forces that tend to move rigid contact sectors presented by the fixed part and/or the moving part and to cause the rigid sectors to vibrate in vibration modes that combine tangential vibration and normal vibration, thereby driving the movement of the moving part, the motor presenting for the tangential vibration or the normal vibration a main resonant mode and at least one secondary resonant mode, wherein the secondary resonant mode is at a frequency that is substantially equal to a harmonic frequency of the main resonant mode.

15 Claims, 5 Drawing Sheets

FIG_1

FIG_2

FIG_6

VIBRATION MOTORS

GENERAL FIELD OF THE INVENTION

The present invention relates to vibration motors.

Vibration motors are also known as "ultrasound" motors which refers to their preferred operating frequency, or as "piezoactive" motors which refers to their preferred excitation material.

The invention is particularly advantageous in application to rotary vibration motors, however it can also be applied to linear actuators, the term "vibration motor" in the present specification covering both rotary motors and linear actuators.

SUMMARY OF ONE POSSIBLE STRUCTURE FOR A VIBRATION MOTOR

A rotary vibration motor conventionally comprises at least one stator and one rotor, together with execution means for deforming said stator and/or said rotor in vibration modes that combine tangential vibrations and normal vibrations suitable for driving the rotor in continuous rotation.

Particularly advantageous vibration motor structures are proposed in particular in patent applications EP 0 907 213 and FR 98/10391 to which reference can advantageously be made. The general principle of those structures is shown diagrammatically in FIGS. 1 and 2.

Figure 1:
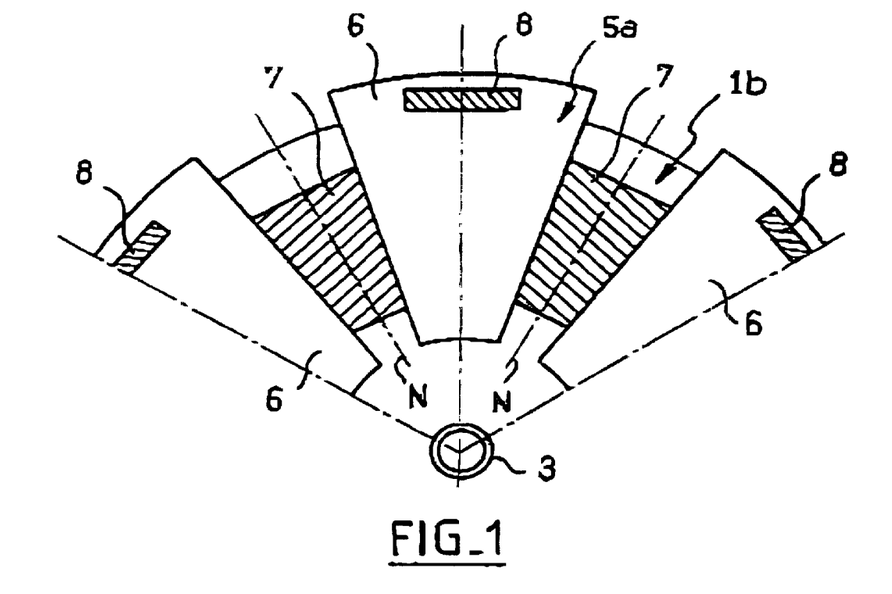
FIGS. 1 and 2, described above, are diagrams respectively in cross-section and in axial section through a vibration motor constituting a possible embodiment of the invention.
Figure 2:
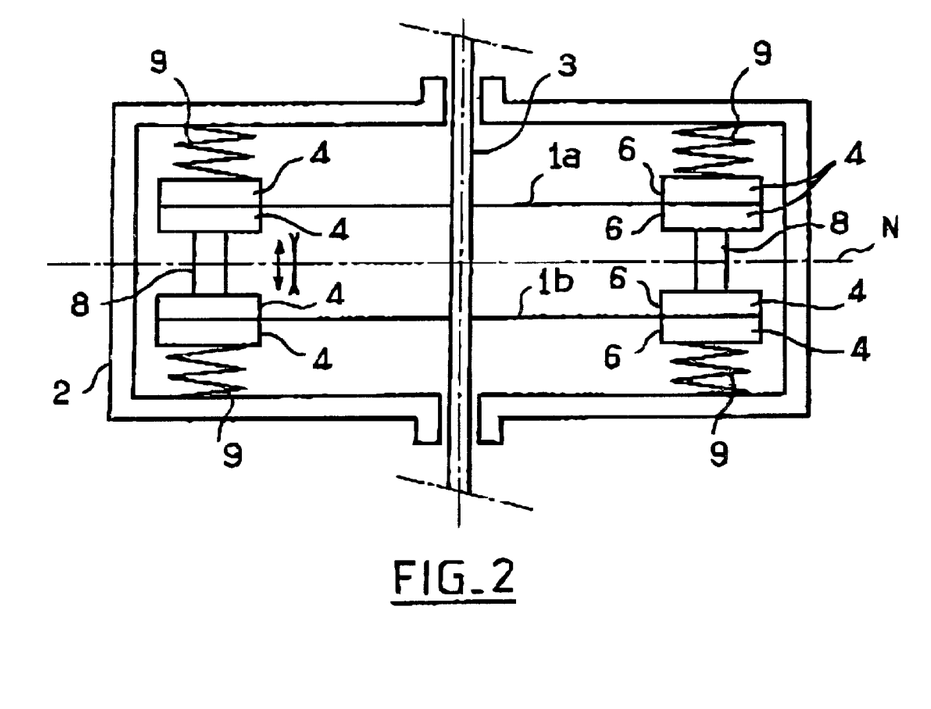

Such a motor comprises an outer casing 2 containing two rotor disks 1 secured to a shaft 3 together with stator plates 4 between which said disks 1 are disposed.

Each stator plate 4 is constituted by a plurality of contact sectors 6 (referred to as stator "petals") which are angularly distributed and which are separated in pairs by active elements 7 for imparting tangential deformation (piezoelectric or other elements). The contact sectors 6 of the two inner plates 4 are in register with one another. Active elements 8 (piezoelectric or other elements) for generating a normal force are interposed between the sectors 6 and these two inner plates 4. Spring-forming means 9 are interposed between the casing 2 and the contact sectors 6 of the outer plates 4.

When an active element 8 lengthens, the contact sectors 6 in register therewith clamp the rotor disks 1. When it retracts, the corresponding contact sectors 6 release the disks 1.

Two active elements 7 on either side of the same sector 6 are excited in phase opposition. Similarly, two adjacent active elements 8 are likewise excited in phase opposition. The active elements 8 for generating a normal force and the active elements 7 for tangential deformation are controlled synchronously so as to drive the rotors 1 in rotation.

STATE OF THE ART AND OBJECTS OF THE INVENTION

One of the problems encountered with vibration motors is that of their efficiency.

Proposals have already been made to use a material having resilient properties in a reciprocating contact zone between a rotor and a stator so as to minimize energy dissipation associated with cyclic friction between the rotor and the stator.

In particular, French patent application FR 2 742 011 proposes using shape memory alloys which are materials having non-linear super-elasticity and which, compared with conventional materials, have the advantage of accommodating large amounts of deformation in small quantities of material.

The term "super-elasticity" is used throughout the present specification to designate the property whereby a material can accept reversible elongation of 1% or more. It is also recalled that the non-linear character of super-elasticity gives rise to the presence of a change-of-phase plateau in the curve of deformation as a function of traction force.

In above-mentioned patent application FR 2 742 011, it is shown that such a structure has the advantage of limiting the peaks of the applied normal force and of maintaining the tangential friction force at values below the slip threshold.

An object of the invention is to further increase the efficiency of vibration motors.

Application BP 0 543 114 discloses an actuator in which bearing contact between the fixed portion and the moving portion is minimized so as to ensure that energy losses due to friction are minimized. In the solution proposed in that document, the contact surface of the fixed part as constituted by the stator is not rigid, but is deformed by the propagation of a traveling wave which drives the moving part which constitutes the rotor. Only the peak of the continuous deformation then comes into contact with the driven part.

It will be understood that that solution does not make it possible to obtain high drive powers of a kind that would be obtainable from vibration motor structures as described above with reference to FIGS. 1 and 2 and operating on the principle of netting rigid sectors into vibration which sectors are moved bodily and not by continuous deformation.

BRIEF SUMMARY OF THE INVENTION

The invention proposes a solution for increasing the efficiency of a vibration motor of the type comprising comprising at least one stationary part and one part driven to move relative to said fixed part, together with excitation means suitable for exerting forces that tend to move rigid contact sectors presented by said fixed part and/or said moving part and to cause said rigid sectors to vibrate in vibration modes that combine tangential vibration and normal vibration, thereby driving the movement of the moving part.

For the tangential vibrations or the normal vibrations, said motor presents a main resonant mode and at least one secondary resonant mode, and the proposed solution consists in that the secondary resonant mode is at a frequency which is substantially equal to a harmonic frequency of the main resonant mode.

In particular, the moving part can be a rigid disk rotor, said motor having a stator which comprises at least one pair of stator plates, each plate having rigid petals suitable for receiving means for displacing said rigid petals tangentially and normally.

In a variant, the motor can be a linear actuator.

In a first advantageous variant, at least one element having elastic deformation properties is included is in the moving part and/or the stationary part, said element being separated from the contact face of said moving part and/or of said fixed part by a shoe-forming portion, and the part (s) In which the elastic deformation elements are included is/are dimensioned in such a manner that the frequency of the secondary tangential resonant mode which is the resonant mode in which the shoe-forming portion and the remainder of the part oscillate in phase opposition, is substantially equal to a frequency which is a harmonic frequency of the main tangential resonant mode, in which the shoe-forming portion and the remainder of the part oscillate in phase.

Such a motor advantageously further includes the various following characteristics:

the frequency of the secondary tangential resonant mode is substantially equal to twice the frequency of the main tangential resonant mode;

it includes an array of elastic elements interposed between the shoe-forming portion and the remainder of the stationary part and/or the moving part; and the elastic element is made of a material presenting properties of super-elasticity.

In another, likewise advantageous variant, which can be implemented in addition to the first variant or independently thereof, the motor presents a secondary normal resonant frequency which is substantially a harmonic frequency of the main normal resonant frequency, and the excitation means comprise means for generating normal vibrations at both of these two resonant frequencies.

Such a motor advantageously further includes the various following characteristics taken singly or in any feasible combination:

it comprises a casing containing at least two is pairs of stator plates having tangential deformation active elements, and two rotor disks which extend between the plates of respective ones of said two pairs, the normal deformation active elements extending in particular between the plates of both of the two facing pairs, spring-forming means being interposed between the pairs of plates and the casing, and it includes, between the stator plates and the spring-forming means, at least one assembly comprising a mass and an elastic deformation element, said assembly being dimensioned in such a manner that the frequency of the secondary resonant mode in which the stator plates and said mass oscillate in phase opposition, is substantially equal to an integer number of times the main resonant frequency in which the stator plates and said mass oscillate in phase, the excitation means including means for exciting normal deformation active elements at a frequency which is substantially equal to the secondary resonant frequency;

an elastic deformation element is a normal deformation active element excited at a frequency substantially equal to the secondary resonant frequency;

a normal deformation active element for the main resonant mode is excited by a signal which is the sum of a signal at the main resonant frequency plus a signal at the secondary resonant frequency;

the secondary resonant frequency is substantially equal to an odd number of times the main resonant frequency;

the secondary resonant frequency is substantially equal to three or five times the main resonant frequency;

the frequency of the secondary resonant mode is equal to an integer number of times the main resonant frequency, with accuracy of the order of $\frac{1}{2}Q$ where Q is the lower of the quality factors of the two resonances, and it includes at least one assembly comprising a mass and a plurality of elastic deformation elements interposed between the stator plates and the spring-forming means, the elastic deformation elements being of stiffnesses such that said elements correspond to a plurality of harmonic resonant frequencies.

DESCRIPTION OF THE FIGURES

Other characteristics and advantages of the invention appear further from the following description which is purely illustrative and non-limiting and which should be read with reference to the accompanying drawings, in which.

DESCRIPTION OF EMBODIMENTS OF THE INVENTION

The invention is described below for a rotary motor, however it naturally applies in the same manner to a linear motor.

Tangential Vibration Modes

Figure 3:
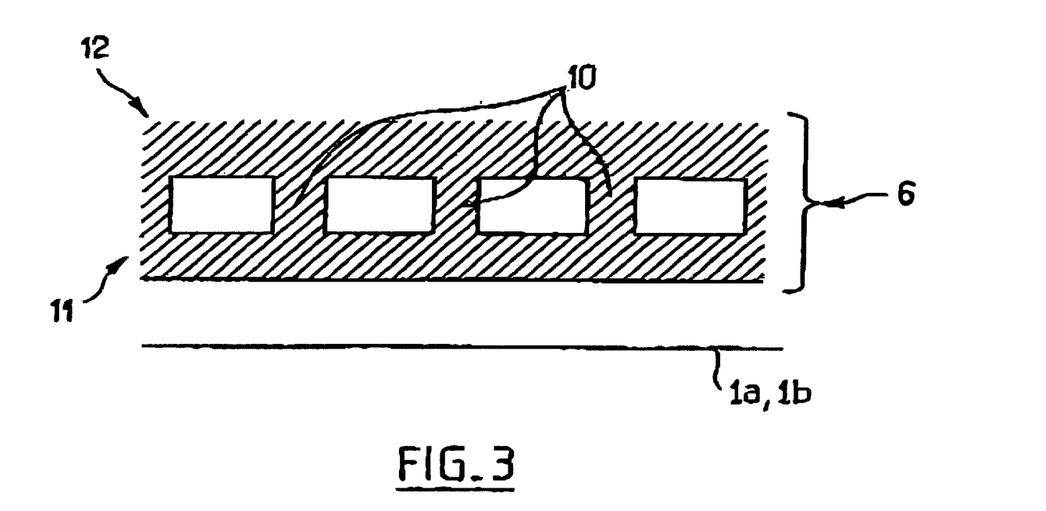
FIG. 3 is a diagram illustrating the zone between a moving part and a stationary part of a vibration motor.

FIG. 3 shows an example of a possible structure for a petal 6 in a structure of the type shown in FIGS. 1 and 2.

The petal 6 is constituted by a metal block having a rain portion 12, a contact shoe 11, and an array of intermediate elements 10 interposed between the portion 12 and the contact shoe 11.

By way of example, the intermediate elements 10 are pegs of cylindrical or other shape, and suitable in particular for accepting bending deformation.

In a variant, they can be constituted by blades, in particular blades that are generally plane in shape, extending at rest perpendicularly to the general plane of the portion 12 and suitable, in particular, for deforming elastically in bending under the effect of a force that moves the contact shoe 11 relative to the portion 12 parallel to the general plane relative to which they extend.

The elements 10 which constitute the elastic portion interposed between the shoe-forming portion 11 and the remainder of the stator (portion 12) is advantageously a semicrystalline polymer, and in particular polyether etherketone (PEEK).

Semicryatalline polymers, and in particular PEEK, have the advantage of a low modulus of elasticity, large elongation, excellent fatigue resistance, and good temperature behavior.

When the elastic intermediate layer is made of such materials, it can be constituted by a solid layer as that it is easier to make.

The main portion 12, the contact shoe 11, and the elements 10 can be molded as a single piece of material that enables the elements 10 to present elastic properties, e.g. a steel.

From the structure shown in FIG. 2, it will be understood that the elements 10 do not come directly into contact with the rotor 1a or 1b, the petal 6 having a portion 11 constituting a contact shoe which separates said element 10 from the rotor 1a or 1b on which said petal 6 comes to bear.

Such a structure is preferable to a structure in which the pegs or blades 10 come directly into contact with the rotor since that would give rise to tribological problems and contact area would be reduced.

Nevertheless, the presence of the shoe-forming portion 11 changes the dynamic behavior of the motor because of its mass.

However, it has been found that by appropriately dimensioning the structure constituted in this way, and in particular by dimensioning the shoe-forming portion 11, it is possible to improve the efficiency of the structure.

Figure 4:
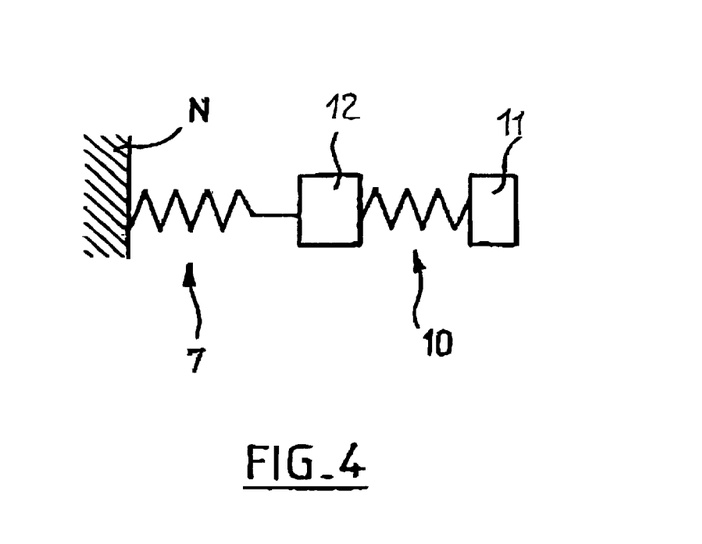
FIG. 4 is a diagram of the oscillating system which is equivalent to the structure shown in FIG. 3.

As shown in FIG. 4, such a structure can be modelled on examining the tangential oscillations generated on the shoe 11 by the vibrations generated on the active elements 7 as an oscillating system presenting;

a first mass (portion 12 which constitutes the main portion of a petal 6);

a first elastic element (array of elements 10);

a second mass (shoe-forming portion 11); and a second elastic deformation element (active element 7) connected to a stationary node N which corresponds to the zone located in the middle of an element 7 between two successive petals 6.

Such a system having two masses and two stiffnesses presents two modes of oscillation:

the first mode (frequency F1) is the main tangential resonant mode in which the shoe-forming portion 11 and the remainder of the petal 6 (portion 12) oscillate in phase, the frequency of this tangential main resonant mode is selected as being the excitation frequency at which the motor is operated; and the second mode (frequency F2) is the secondary tangential resonant mode in which the shoe-forming portion 11 and the remainder of the petal 6 (portion 12) oscillate in phase opposition, in this mode, the amplitude of the oscillation of the portion 12 of the petal is much smaller than the amplitude of the oscillation of the shoe-forming portion 11, since the mass of the portion 11 is smaller.

The inventors have found that the efficiency with which vibration is converted into continuous movement is greatly improved when the petals of the stators are dimensioned so that the frequency F2 corresponds to a harmonic of the frequency F1 (F2=NF1, where N is an integer), and in particular when:

F2=2F1

In particular, it is desirable for this condition, F2=2F1, to be complied with to within better than 10%.

Dimensioning includes selecting the shapes and the masses of the various portions of the petals, the distribution thereof, and in particular the distribution of the elements 10, etc.

Figure 5A:
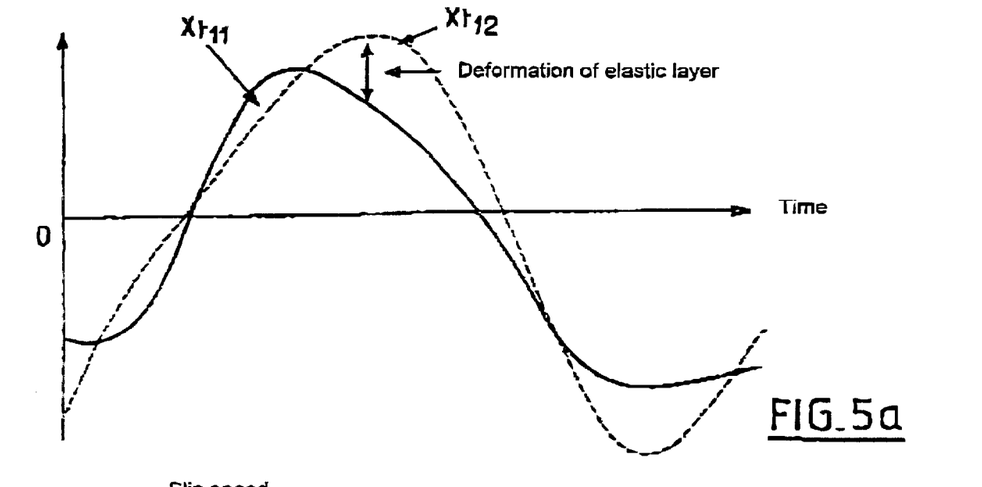
FIGS. 5a to 5c are graphs showing variations as a function of time in the deformation of the various layers in FIG. 3 (FIG. 5a), of the slip speed between the layers (FIG. 5b), and of the friction forces acting therebetween (FIG. 5c)
Figure 5B:
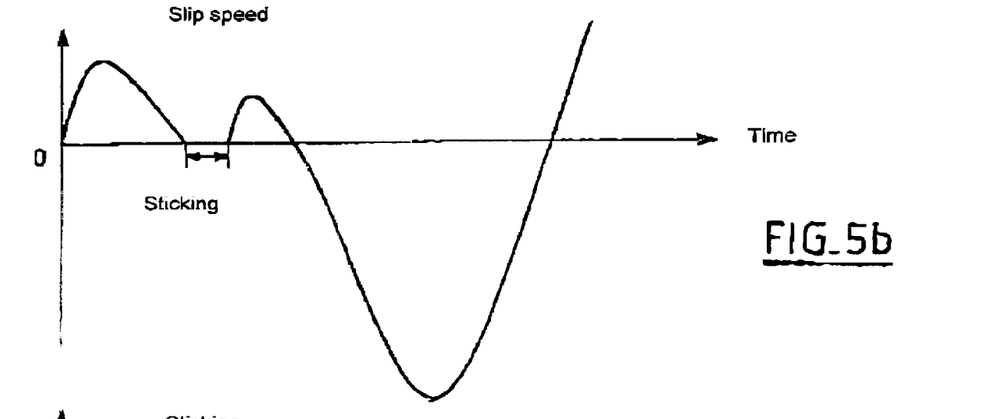
Figure 5C:
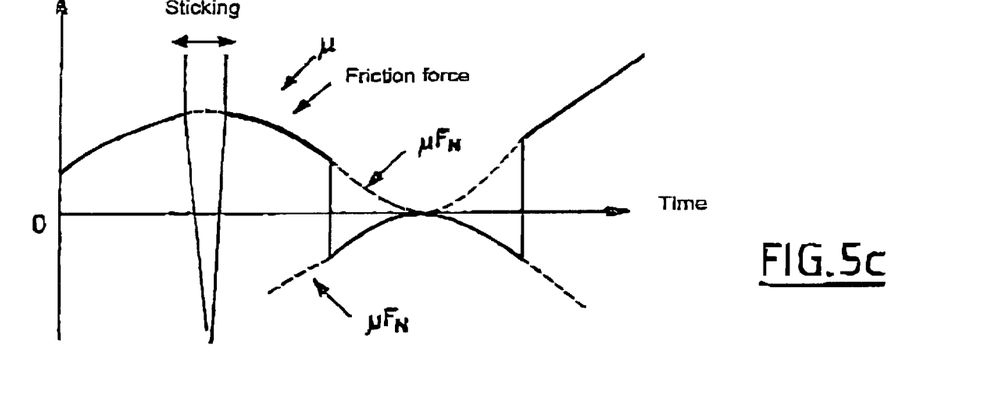

The curves given in FIGS. 5a to 5c show that under such circumstances, the speed of the shoe remains close to the speed of the rotor during a longer fraction of the cycle, thereby minimizing friction losses.

In FIG. 5a, the curve $Xt_{12}$ shows the tangential displacement of the portion 12 of a petal 6 while the curve $Xt_{11}$ shows the tangential displacement of the corresponding shoe 11.

In FIG. 5b, the curve shows the slip speed between the shoe 11 and the rotor it drives.

During a driving phase, the slip speed is minimized with the elements 10 and the shoe-forming portion 11 being dimensioned for increasing compliance with the condition F2=2F1; sticking takes place over a large fraction of this driving phase.

During the other phase of the cycle, the slip speed becomes negative.

FIG. 5c shows how the friction force between the stator and the rotor varied over time.

Figure 6:
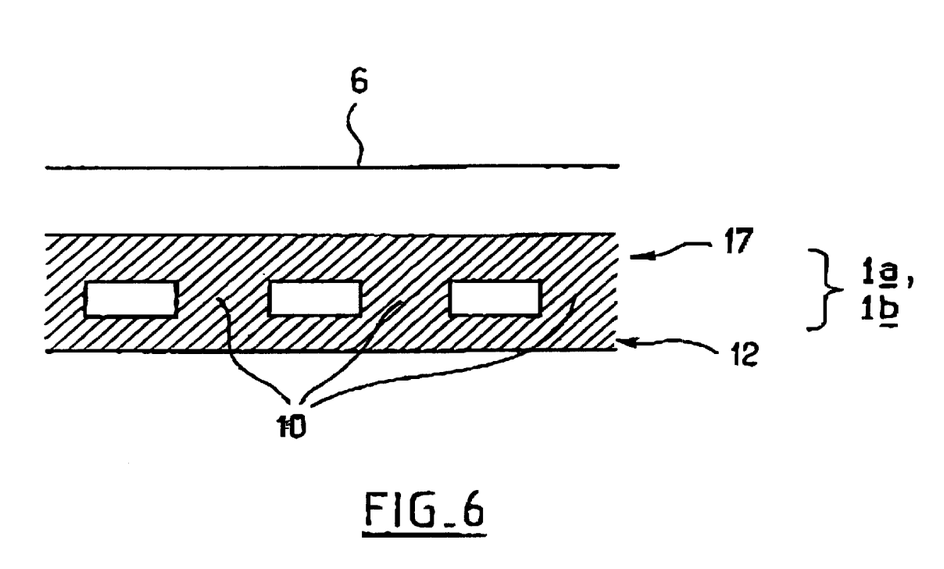
FIG. 6 is a view similar to FIG. 4 showing another possible embodiment of the invention.

Naturally, the invention applies in the same manner when the oscillating elements are not included in the stator but are included in the rotor, as shown in FIG. 6.

The rotor is then dimensioned so as to enable F2=2F1.

Naturally, under all circumstances, the pegs or blades 10 are advantageously made of materials that present super-elasticity, and in particular linear super-elasticity.

Materials preventing non-linear super-elasticity such as shape memory alloys can also be envisaged.

It will be observed that the above description applies to the case of the preferred embodiment in which N=2. Nevertheless, other harmonic values produce similar effects, but with reduced Intensity. In addition, an odd harmonic would produce peak limiting effects not only in the right-hand portion of the slip speed (curve analogous to that shown in FIG. 5b), but also in the left-hand portion thereof, but this is of no use.

Normal Vibration Modes

Figures 7, 8:
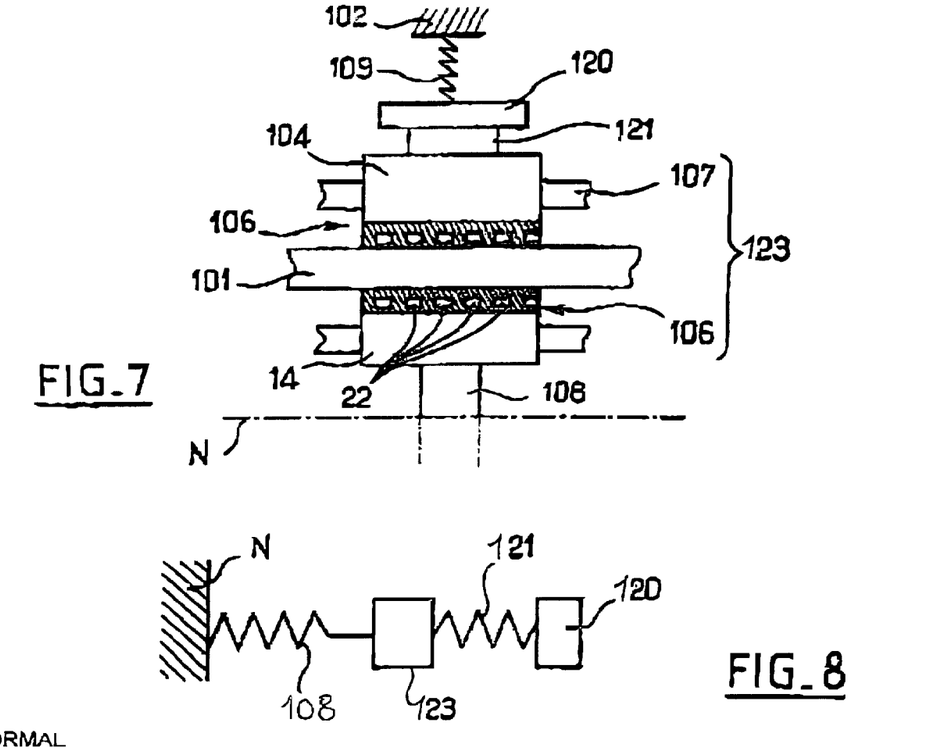
FIG. 7 is a diagram showing a vibration motor structure constituting a possible embodiment of the invention.
FIG. 8 is a diagram showing the oscillating system equivalent to the link between the stator petals and the casing of the vibration motor shown in FIG. 7.

The vibration motor shown in FIG. 7 is similar in structure to that shown in FIGS. 1 and 2 and the same reference numerals plus 100 are used to designate structural elements shown in FIG. 7 that are the same as elements shown in FIGS. 1 and 2.

Thus, the structure shown in FIG. 7 comprises a casing 102 containing two rotor plates 101 each interposed between two stator plates 104.

The stator plates 104 are constituted by metal petals 106 that are spaced apart by active tangential deformation elements 107.

A petal 106 is advantageously a metal petal having at least one elastically deformable element included therein. By way of example, the petal 106 includes an array of elements 122 such as pegs or blades in the vicinity of its surface, these elements 122 being preferably spaces apart from the contact surface of the petal by a shoe-forming portion thereof.

Normal deformation active elements 108 are interposed between the petals 106 of the inner two stator plates 104 (i.e. the two stator plates which are situated between the other two, which other two are referred to as "outer" stator plates).

Spring-forming means 109 are interposed between the casing 102 of the motor and the petals 106 of the two outer stator plates 104.

More precisely, each petal 106 of the outer stator plates carries a complementary mass 120 which is mounted on said petal via a normal deformation active element 121 (e.g. made of piezoelectric material), the spring-forming means 109 bearing against said mass 120.

Such a structure can be modelled as an oscillating system presenting;

a first mass (the mass 120);

a first elastic deformation element (the active element 121);

a second mass referenced 123 (corresponding to two petals 16 on either side of the portion of the rotor 101 corresponding thereto); and a second elastic deformation element (portion of an element 108 which extends between said mass 123 and the midplane N of the elements 108, said midplane being considered as a fixed node of the system).

Such a system with two masses and two stiffnesses present two modes of oscillation:

the first mode (frequency F1) is the main normal resonant mode in which the masses 120 and 123 oscillate in phase; the frequency of this resonant mode is selected as being the excitation frequency for the tangential and normal deformation active elements 107 and 108, the motor having excitation means for this purpose; and the second mode (frequency F2) is the secondary normal resonant mode in which the masses 120 and 123 oscillate in phase opposition.

The mass 120 and the active element 121 are dimensioned (shape, mass, material, etc.) so that the frequency F2 is equal to N×F1 where N is an integer, and the motor has means for exciting said active element 121 at said frequency F2.

Advantageously, N is selected to be odd.

Figure 9:
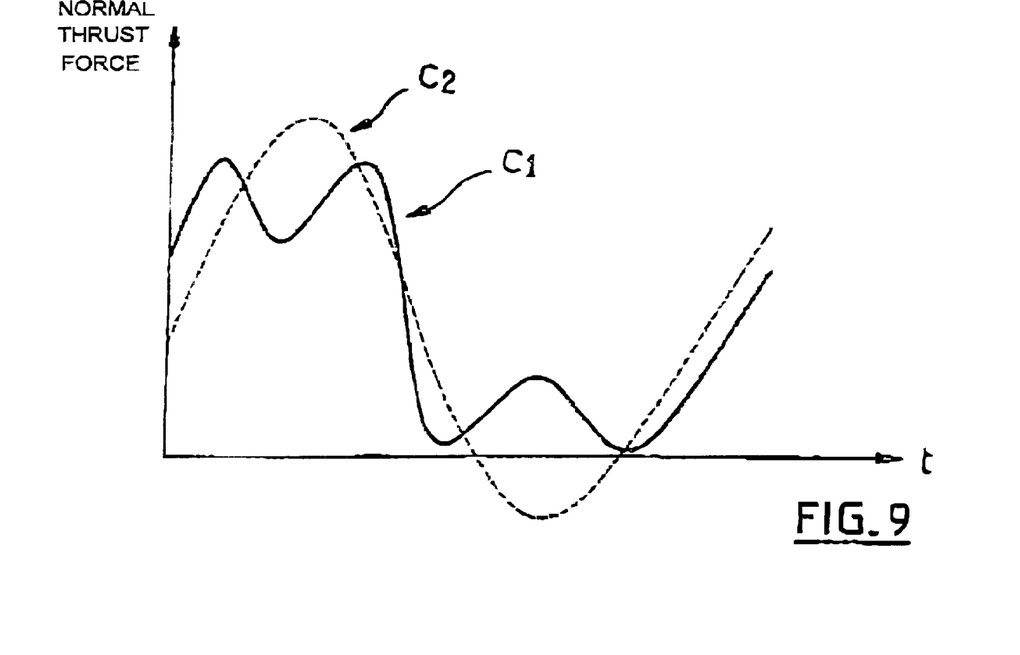
FIG. 9 is a graph showing variation as a function of time in the bearing force between a rotor and a stator, firstly when controlled in accordance with the prior art (dashed line cure) and secondly when controlled in accordance with an embodiment of the invention (continuous line curve).

The thrust force then obtained is that shown in FIG. 9 (continuous line curve C1) which is substantially peak limited compared with the curve obtained by exciting only the active elements 107 and 108 at the frequency F1 (dashed line curve C2).

It will be observed that when N is even, the peak limiting effect is also obtained, but on one side of the cycle only, only the top portion being peak limited.

In particular, it is preferable to select N=3 or N=5, small-order harmonies providing larger effects.

Nevertheless, it is possible for N to have values other than N=3 or N=5.

Because the normal mode is damped much less than the tangential mode, the relationship F2=NF1 ought preferably to be achieved with great accuracy. It is estimated that the necessary accuracy is about ½Q where Q represents the lower of the quality factors of the two resonances.

A variant of the solution described above consists in replacing the active element or block 121 by an equivalent passive stiffness and in feeding the main actuator with excitation at a frequency NF1 in addition to its fundamental excitation at the frequency F1.

Furthermore, in another advantageous variant, a plurality of elastic deformation elements 109 can be provided between a mass 120 and the remainder of a petal 106 said elements having different stiffnesses and consequently corresponding to different secondary resonant modes, said elements being selected so that their frequency corresponds to a harmonic of the main frequency.

By combining the excitation frequencies corresponding to these various harmonics, it is possible to obtain normal bearing forces that are even more peak limited than as shown in FIG. 9.

It is possible to envisage numerous other variant embodiments enabling a main resonant mode at at least one secondary resonant mode to be provided such that their respective resonant frequencies satisfy F2=NF1.

What is claimed is:

1. A vibration motor comprising at least one stationary part and one part driven to move relative to said fixed part, together with excitation means suitable for exerting forces that tend to move rigid contact sectors presented by at least one said stationary part and said moving part and to cause said rigid sectors to vibrate in vibration modes that combine tangential vibration and normal vibration, thereby driving the movement of the moving part, said motor presenting for the tangential vibration or the normal vibration a main resonant mode and at least one secondary resonant mode, wherein the secondary resonant mode is at a frequency that is substantially equal to a harmonic frequency of the main resonant mode.

2. A motor according to claim 1, wherein the moving part is a rigid disk rotor, said motor having a stator which comprises at least one pair of stator plates, each plate having rigid petals suitable for receiving means for displacing said rigid petals tangentially and normally.

3. A motor according to claim 2, comprising a casing containing at least two pairs of stator plates having tangential deformation active elements, and two rotor disks which extend between the plates of respective ones of said two pairs, the normal deformation active elements extending in particular between the plates of both of the two facing pairs, spring-forming means being interposed between the pairs of plates and the casing, the motor presenting a secondary normal resonant frequency which is substantially a harmonic frequency of the main normal resonant frequency, wherein the excitation means comprise means for generating normal vibrations at both of these two resonant frequencies and wherein the motor includes, between the stator plates and the spring-forming means, at least one assembly comprising a mass ad an elastic deformation element, said assembly being dimensioned in such a manner that the frequency of the secondary resonant mode in which the stator plates and said mass oscillate in phase opposition, is substantially equal to an integer number of times the main resonant frequency in which the stator plates and said mass oscillate in phase, the excitation means including means for exciting normal deformation active elements at a frequency which is substantially equal to the secondary resonant frequency.

4. A motor according to claim 3, wherein an elastic deformation element is a normal deformation active element excited at a frequency substantially equal to the secondary resonant frequency.

5. A motor according to claim 3, wherein a normal deformation active element for the main resonant mode is excited by a signal which is the sum of a signal at the main resonant frequency plus a signal at the secondary resonant frequency.

6. A motor according to claim 3, including at least one assembly comprising a mass and a plurality of elastic deformation elements interposed between the stator plates and the spring-forming means, the elastic deformation elements being of stiffnesses such that said elements correspond to a plurality of harmonic resonant frequencies.

7. A motor according to claim 1, wherein at least one element having elastic deformation properties is included in at least one of the moving part and the stationary part, said element being separated from the contact face of at least of said moving part and said stationary part by a shoe-forming portion, and wherein at least one of the moving part and the stationary part in which the elastic deformation elements are included is dimensioned in such a manner that the frequency of the secondary tangential resonant mode which is the resonant mode in which the shoe-forming portion and the remainder of the part oscillate in phase opposition, is substantially equal to a frequency which is a harmonic frequency of the main tangential resonant mode, in which the shoe-forming portion and the remainder of the part oscillate in phase.

8. A motor according to claim 7, wherein the frequency of the secondary tangential resonant mode is substantially equal to twice the frequency of the main tangential resonant mode.

9. A motor according to claim 7, including an array of elastic elements interposed between the shoe-forming portion and the remainder of the stationary part and/or the moving part.

10. A motor according to claim 7, wherein the elastic element is made of a material preventing properties of super-elasticity.

11. A motor according to claim 7, wherein the elastic deformation element(s) is/are made of semicrystalline polymer.

12. A motor according to claim 1, presenting a secondary normal resonant frequency which is substantially a harmonic frequency of the main normal resonant frequency, and wherein the excitation means comprise means for generating normal vibrations at both of these two resonant frequencies.

13. A motor according to claim 12, wherein the secondary resonant frequency is substantially equal to an odd number of times the main resonant frequency.

14. A motor according to claim 12, wherein the secondary resonant frequency is substantially equal to three or five times the main resonant frequency.

15. A motor according to claim 12, wherein the frequency of the secondary resonant mode is equal to an integer number of times the main resonant frequency, with accuracy of the order of $1/2Q$ where Q is the lower of the quality factors of the two resonances.

* * * * *

UNITED STATES PATENT AND TRADEMARK OFFICE
CERTIFICATE OF CORRECTION

PATENT NO. : 6,628,044 B2
DATED : September 30, 2003
INVENTOR(S) : Audren et al.

It is certified that error appears in the above-identified patent and that said Letters Patent is hereby corrected as shown below:

Title page,
Item [57], ABSTRACT,
Line 2, after "relative to" please insert -- said --.
Line 3, please delete "that is" and insert -- means --.
Lines 4, 5 and 8, please delete "the" and insert -- said --.

Column 7,
Line 56, please delete "one" and insert -- a moving --.
Line 56, please delete "fixed" and insert -- stationary --.

Column 9,
Line 2, please delete "preventing" and insert -- presenting --.

Signed and Sealed this

Twenty-ninth Day of March, 2005

JON W. DUDAS
*Director of the United States Patent and Trademark Office*